(12) United States Patent
Dahlman et al.

(10) Patent No.: US 7,791,326 B2
(45) Date of Patent: Sep. 7, 2010

(54) AC-POWERED, MICROPROCESSOR-BASED, DIMMING LED POWER SUPPLY

(75) Inventors: Mark Cobb Dahlman, Huntsville, AL (US); John Charles Glenn, Hillsborough, NC (US)

(73) Assignee: Texas Instruments Incorporated, Dallas, TX (US)

( * ) Notice: Subject to any disclaimer, the term of this patent is extended or adjusted under 35 U.S.C. 154(b) by 440 days.

(21) Appl. No.: 12/006,100

(22) Filed: Dec. 28, 2007

(65) Prior Publication Data

US 2009/0167203 A1    Jul. 2, 2009

(51) Int. Cl.
*G05F 1/40* (2006.01)
*G05F 1/00* (2006.01)

(52) U.S. Cl. .................. 323/284; 323/282; 323/277; 323/234; 323/351; 315/291; 315/247; 315/274; 315/224

(58) Field of Classification Search ........... 323/266, 323/265, 276, 277, 282, 283, 284, 287, 286, 323/351, 349, 320; 315/291, 307–311, 247, 315/246, 224, 225, 274, 279
See application file for complete search history.

(56) References Cited

U.S. PATENT DOCUMENTS

| 7,038,399 | B2 | 5/2006 | Lys et al. | |
| 7,453,248 | B2* | 11/2008 | Takeuchi | 323/285 |
| 2009/0184699 | A1* | 7/2009 | Natsume et al. | 323/282 |
| 2010/0090673 | A1* | 4/2010 | Nakagawa et al. | 323/284 |

* cited by examiner

*Primary Examiner*—Tuyet Vo
(74) *Attorney, Agent, or Firm*—John J. Patti; Wade J. Brady, III; Frederick J. Telecky, Jr.

(57) ABSTRACT

A dimmable, light-emitting diode (LED) power supply adapted to provide a direct current (DC), constant current ("constant current source") from a conventional, phase-controlled 120 VAC, 60 Hz power source is disclosed. The constant current source of the present invention utilizes two processes to control dimming. In a first process, the phase angle of the input voltage is used to control the duty cycle of a line frequency pulse width modulation (PWM). In a second process, a proportional-current limit adjustment is used to control the average current to the LED during the ON time of the line frequency by PWM. As a result, at relatively low phase angles, peak currents can be lowered, reducing flicker and improving the audible noise levels generated by the circuit.

23 Claims, 4 Drawing Sheets

AC-POWERED, MICROPROCESSOR-BASED, DIMMING LED POWER SUPPLY

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Light-dimming is effected by adjusting the magnitude and/or the time of application of current to a light source(s). For example, control and dimming of a light source(s) using pulse width modulation (PWM) is well-known to those of ordinary skill in the relevant art. PWM-dimming works by varying the amount or length of time a switching device, such as a TRIAC, is in an ON state during a cycle relative to the total cycle time. This is referred to as the "duty cycle". Typically, PWM-dimming supplies power (current) to the light source when an input voltage is above a threshold voltage (ON), and withholds power when the input voltage is below the threshold voltage (OFF). The longer the duty cycle, the relatively-brighter the light source(s), and the shorter the duty cycle, the relatively dimmer the light source(s).

Conventional, solid-state, PWM-dimming switches typically include a switching device, e.g., a TRIAC, and a firing capacitor. The charged time of the capacitor is delayed by the setting of the dimming device. Once the firing capacitor has reached a predetermined voltage, the capacitor discharges or "fires", triggering the TRIAC. The TRIAC will continue to conduct electricity to the light source(s) until there is no current, which happen twice per cycle at each of the zero crossings of the AC current sine wave. Accordingly, by controlling the rate at which the capacitor is charged, one can control the firing time of the capacitor.

As an alternative to PWM-dimming directly from the TRIAC, relatively-large input and/or output storage capacitative devices can be used to capture and store charge (energy). Dimming can then be achieved by PWM-dimming at a higher frequency, to prevent flicker. Relatively large input and/or output storage capacitative devices, however, are expensive and consume space, hence, their use is undesirable in many applications.

However, as high-power, light-emitting diodes (LEDs) and LED clusters are used more and more in housing, commercial, and industrial applications to replace conventional light sources, e.g., incandescent light bulbs, the need to retrofit conventional, in situ light-dimming switches economically is desirable. However, conventional dimming switches cannot dim LEDs or LED clusters effectively, especially at low or relatively-low current levels, using just the phase angle of the input voltage.

Another problem with prior art PWM-dimming techniques includes flicker resulting from TRIAC jitter and noise. Analog-driven TRIACs experience jitter at their turn-on phase angle. The effect of the jitter is a function of current magnitude and the duty cycle.

U.S. Pat. No. 7,038,399 to Lys, et al. discloses an apparatus and method for powering solid-state, LED-based light sources using non-standard line voltage signals generated by a conventional AC dimming circuits. According to Lys, et al., a controller can be used to condition the AC signals generated by the AC dimming circuit, to drive the LED light sources.

Accordingly, it would be desirable to provide a power control system that adapts standard, phase-angle, wall-dimming switches for use with high-power LEDs and LED clusters similar to what has been disclosed by Lys, et al. but by using a sensed or average input voltage. Moreover, it would be desirable to provide a power control system that reduces flicker resulting from jitter using proportional current PWM-dimming.

BRIEF SUMMARY OF THE INVENTION

A dimmable, light-emitting diode power supply adapted to provide an adjustable, direct current (DC), constant current ("constant current source") from a conventional, phase-controlled 120 VAC, 60 Hz power source is disclosed. The constant current source of the present invention utilizes two processes to control dimming. In a first process, the phase angle of the input voltage is used to control pulse width modulation (PWM). More specifically, whenever the input voltage exceeds a pre-determined threshold voltage, a PWM-dimming signal provides power to the output. However, whenever the input voltage drops below the predetermined threshold voltage, the PWM signal is turned off, to avoid flicker.

In a second process, a proportional current limit adjustment is used to control the duty cycle. As a result, at relatively low phase angles, peak and average currents can be lowered, improving the audible noise levels generated by the circuit.

Advantageously, 120 Hz audible noise generated by the TRIAC-dimming circuit is reduced; dimming performance at low-light power levels can be enhanced without flicker; and non-linear dimming techniques can be implemented that, to the human eye, appears to be more "linear".

BRIEF DESCRIPTION OF THE SEVERAL VIEWS OF THE DRAWINGS

The invention will be more fully understood by reference to the following Detailed Description of the invention in conjunction with the Drawing, of which.

DETAILED DESCRIPTION OF THE INVENTION

Figure 1A:
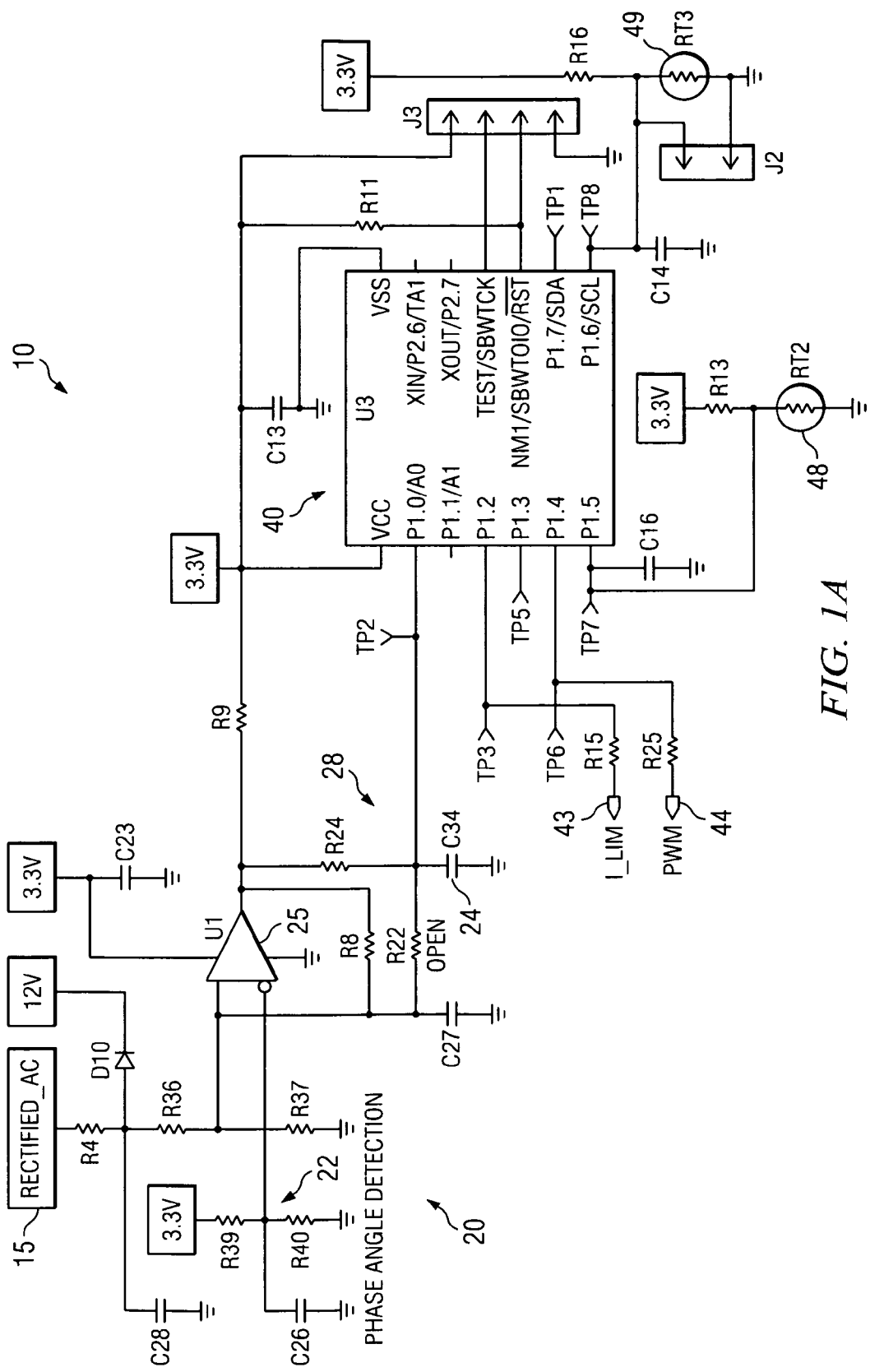
FIG. 1 shows an illustrative schematic diagram of a light-emitting diode dimming system in accordance with the present invention.
Figure 1B:
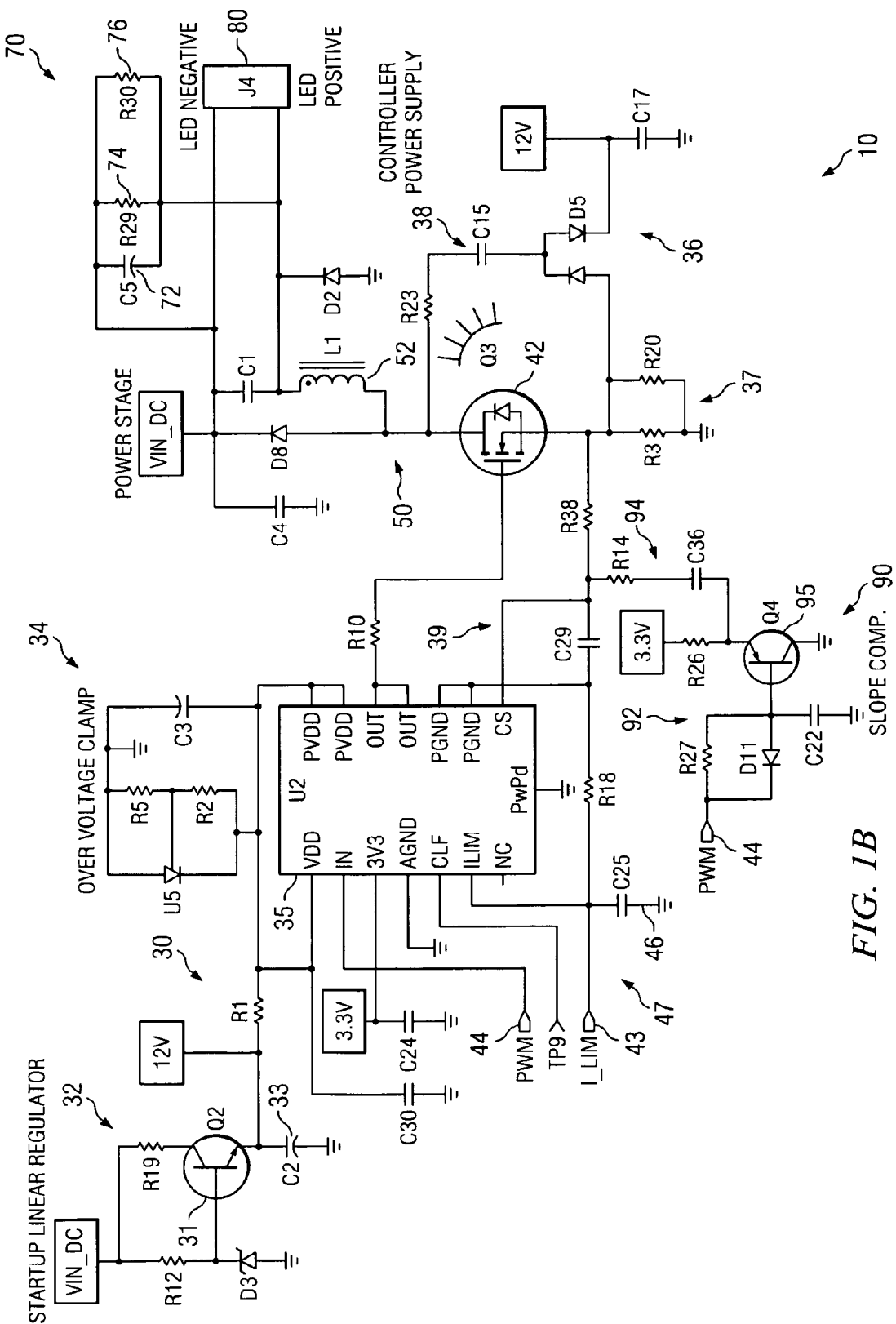
Figure 1C:
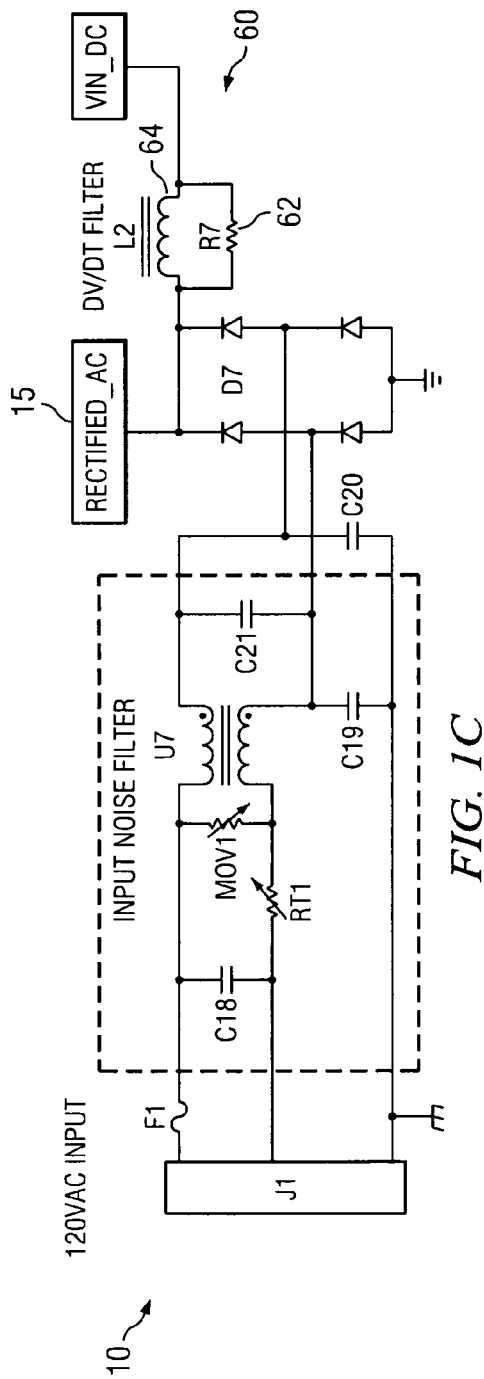

An illustrative schematic diagram for a phase-control, PWM-based dimming circuit 10 is shown as FIG. 1. The dimming circuit 10 provides power to a light source(s) 80 and includes a phase-angle detection circuit 20, a controller power supply 30, a controller 40, a power stage 50, a dv/dt filter 60, an optional output filter 70, and an optional slope compensation circuit 90.

Although the invention will be described in connection with a TRIAC, those of ordinary skill in the art can appreciate that proportional-current PMW-dimming control can also be accomplished using an integrated gate bi-polar transistor (IGBT).

Phase-angle Detection Circuit

The phase-angle detection circuit 20 is structured and arranged to sense input voltage ($V_{IN}$) from a conventional, phase-controlled 120 VAC, 60 Hz power source 15, such as a standard AC outlet, and to provide a filtered, DC pulse signal to the controller 40 that is based on the sensed input voltage and pseudo-representative of the input voltage's RMS value ($V_{RMS}$).

The phase-angle detection circuit 20 includes a voltage divider 22, a capacitive element 24, which can be part of an RC filtering circuit 28, and a comparator 25. As shown in FIG. 1, the output of the comparator 25 of the phase-angle detection circuit 20 is electrically coupled to one of the input pins of the controller 40, e.g., PIN 2.

The voltage divider 22 includes resistive elements (R39 and R40), which are electrically coupled in series between a voltage source having a predetermined, fixed voltage, e.g., 3.3V, and ground. The voltage divider 22 is used to set the predetermined threshold voltage at one of the inputs of the comparator 25, where it is compared to the input voltage from the source 15.

When the input voltage from the source 15 exceeds the threshold voltage ($V_{IN}>V_{TH}$), the comparator 25 outputs a voltage HI signal pulse. Otherwise, when the input voltage is less than the threshold voltage ($V_{IN}<V_{TH}$), the comparator 25 outputs a voltage LO signal pulse or no signal pulse.

The voltage HI signal pulse charges the capacitive element (C34) 24. The size and capacity of the capacitive element 24 is structured and arranged so that as the capacitive element 24 charges, the signal to the controller 40 becomes pseudo-representative of the input voltage's RMS voltage ($V_{RMS}$).

The phase-angle detection circuit 20 shown in FIG. 1 includes an RC filter 28, which filters noise that, inter alia, causes flicker at low current light levels. The RC filter 28, however, is optional. When the RC filter 28 is not included with the dimming circuit 10, the comparator 25 outputs an unfiltered, DC pulse signal directly into the controller 40. This option, however, requires greater processing power.

Controller Power Supply

The dimming circuit 10 includes a relatively-low voltage power supply 30 for powering the controller 40 and, more particularly, the main switch driving circuit 35. The controller power supply 30 includes a start-up linear regulator 32, an over-voltage clamp circuit 34, and a "flying capacitor" charge pump 36. The start-up linear regulator 32 and the over-voltage clamp circuit 34 are each electrically coupled to at least one of the pins, e.g., pins 13 and 14, of a main switch driving circuit 35. The flying capacitor charge pump 36 is electrically coupled to the output of the linear regulator 32 as well as to the power stage 50.

Because the main switch driving circuit 35 and the main switch 42 are frequently in an OFF state, the start-up linear regulator 32 is adapted to deliver a predetermined voltage to the main switch driving circuit 35 until switching of the main switch 42 has been initiated. Once switching has been initiated, the flying capacitor (C15) 38 can supply additional current to the main switch driving circuit 35 by returning some of the power that flows from the power stage 50 when the main switch 42 is ON.

The start-up linear regulator 32 is adapted to maintain the line voltage ($V_{DD}$) at a desired voltage, e.g., approximately 10.3V. More particularly, when power is first applied to the power stage 50, current from a DC voltage source is made to flow through a switching device (Q2) 31 until the voltage sensed at a capacitive element (C2) 33 is approximately 10.3V. However, once the sensed voltage at capacitive element (C2) 33 exceeds a predetermined maximum voltage, e.g., approximately 10.5V, the switching device (Q2) 33 of the linear regulator 32 will automatically turn OFF for increased efficiency.

The flying capacitor charge pump 36 includes a flying capacitor (C15) 38 that is adapted to bleed off some of the power (current) from the power stage 50 when the main switch 42 is in an ON state and to provide this voltage to power the main switch driving circuit 35. The over-voltage clamp circuit 34 is provided to dissipate energy whenever the flying capacitor charge pump 36 generates and delivers more current than the main switch driving circuit 35 demands.

Controller

The controlling circuitry for the dimming circuit 10 includes a controller 40, a main switch (Q3) 42, and a main switch driving circuit 35. For illustrative purposes only, the main switch 42 in FIG. 1 is shown as a field effect transistor (FET). Those of ordinary skill in the art can appreciate that other solid-state switching devices can also be used. As shown in FIG. 1, the drain of the main switch is electrically coupled to the power stage 50; the source of the main switch is electrically coupled to one of the pins of the main switch driving circuit 35, e.g., the current sense (CS) signal PIN; and the gate of the main switch 42 is electrically coupled to at least one of the output pins of the main switch driving circuit 35, e.g., pins 11 and 12.

The controller 40 is a programmable microprocessor, such as a low-power MSP430 manufactured by Texas Instruments of Dallas, Tex., that is capable of receiving and processing signal and other data and of executing a plurality of software and/or hardware applications, driver programs, algorithms, and the like, to control the peak current and duty cycle to the light source(s) 80.

As previously mentioned, the controller 40 is electrically coupled to the phase-angle detection circuit 20, e.g., PIN 2, and to the main switch driving circuit 35, e.g., PINS 4 and 6. The controller 40 is adapted to convert pulse signals from the comparator 25 of the phase-angle detection circuit 20 into control signals, for the purposes of controlling, i.e., setting, the peak current (I_LIM) 43 to the power stage 50 and for proportionally-adjusting a pulse width modulation (PWM) duty cycle associated with a 1-2 kHz PWM signal, which is based on the limiting, peak current (I_LIM). The controller 40 is further adapted to provide a PWM clock signal to the main switch driving circuit 35.

In short, the controller 40, via the software and/or hardware applications, driver programs, algorithms, and the like, is adapted, inter alia, to establish the switching frequency of the main switch driving circuit 35 using a first PWM signal having a frequency of approximately 125 kHz; to adjust the duty cycle a second PWM signal having a frequency of about 1-2 kHz based on signal data from the phase-angle detection circuit 20; and to proportionally-adjust the peak level of the current to the light source(s) vis-à-vis the duty cycle at low or relatively-low current levels.

The main switch driving circuit 35 is electrically coupled to the controller 40 and is further adapted to receive the limiting, peak current (I_LIM) signals 43 and the PWM clock signals 44 generated by the controller 40. The main switch driving circuit 35 is also electrically coupled to the flying capacitor charge pump 36 and is further adapted to receive the CS signal therefrom.

Among the plurality of software and/or hardware applications, driver programs, algorithms, and the like is an algorithm that compares CS signals to the limiting, peak current (I_LIM) signals 43. Based on that comparison, the main switch driving device 35 is structured and arranged to control the gate of the main switch 42. By controlling the timing of opening and closing of the gate of the main switch 42, the main switch driving circuit 35 proportionally-adjusts the duty cycle of the first PWM signal 44 for a particular limiting, peak current (I_LIM).

Power Stage

The power stage 50 is electrically coupled to a DC voltage source, to the light source(s) 80, and to the main switch 42. For illustrative purposes only, the power stage 50 shown in FIG. 1 is a buck regulator power stage.

When the main switch 42 is in an ON state, the power stage 50 delivers current from the light source(s) 80 through an inductive element 52 and the main switch 42 to a current-sensing device 37, which, for illustrative purposes only is shown in FIG. 1 as two resistive elements (R3 and R20). Current passing through the resistive elements (R3 and R20) generates voltage, which, after filtering by an RC filter 39, e.g., resistive element R38 and capacitive element C29, is applied to the CS signal PIN of the main switch driving circuit 35 where the CS signal is compared to the voltage associated with the limiting, peak current (I_LIM) and the RC filter 47.

As will be described in greater detail below, once the voltage at the CS signal PIN exceeds the voltage associated with the limiting, peak current (I_LIM), the main switch driving circuit 35 outputs a gate drive signal to open (turn OFF) the main switch 42, preventing further current flow therethrough until the next leading- or rising-edge clock cycle. Thus, current flowing in the light source(s) 80 is used to control the opening and closing of the main switch 42 and, resultingly, PWM-dimming by proportionally-limiting the peak current is achieved, e.g., at low or relatively-low current levels. More particularly, the peak current is proportionally-scaled to the pseudo-representative RMS voltage of the AC input voltage.

Dv/Dt Filter

The dv/dt filter 60 is electrically coupled between the rectified AC current delivered by the utility grid 15 and the DC power source to the power stage 50. The dv/dt filter 60 is used to protect the input capacitor from the large change in input voltage generated from a TRIAC-driven phase controlled circuit. This circuit limits the inrush current when the TRIAC turns on and prevents the line current from ringing back to zero or near zero. If this circuit were not present, the line current could ring back to zero and cause the TRIAC to turn off prematurely. The dv/dt filter 60 includes a dampening resistive element 62 and a relatively-low equivalent series resistance (ESR) inductive element 64. As shown in FIG. 1, the resistive element 62 and the inductive element 64 are arranged in parallel.

Output Filter

In order to provide an expanded dimming range, delivery of low or relatively-low current levels to the light source(s) 80 is often desirable. Hence, if the dimming circuit 10 is designed to operate at an expanded dimming range and/or to deliver low or relatively-low light current levels, an optional output filter 70 can be added to the dimming circuit 10 at the output of and parallel to the power stage 50. Advantageously, with an output filter 70, the LED light source(s) 80 can be dimmed lower while the TRIAC remains turned ON.

The output filter 70 can be a RC circuit comprising at least one capacitive element 72 and at least one resistive element 74 and 76. The output filter 70 enhances the behavior of the light source(s) 80 by dissipating energy through the resistive elements 74 and 76 and also by filtering out very low current output pulses via the capacitive element 72. The capacitive element 72 also reduces ripple in the output current.

Light Sources

As is well-known to those of ordinary skill in the art, high-power LED light sources 80, e.g., 1 to 2 W LEDs, can produce significant levels of light even when current levels are on the order of approximately 10 mA. Conventional systems at this low current level, however, may cause the TRIAC to turn OFF (or not to turn ON) and/or can result in flicker that is caused by TRIAC jitter.

Slope Compensation Device

To prevent or minimize sub-harmonic oscillation, an optional slope compensation device 90 can be included with the dimming circuit 10. However, when the maximum duty cycle is pre-set at 50 percent, e.g., by an application and/or by being hardwired in the controller 40, addition of a slope compensation device is redundant and not needed.

The slope compensation device 90 is electrically coupled to the controller 40 and to the CS PIN of the main switch driving circuit 35 and is adapted to add a ramp signal on the CS pin to minimize or prevent sub-harmonic oscillation. The slope compensation device includes a switching device (Q4) 95 and an RC filter 92 (resistive element R27 and capacitive element C22).

The base of the amplifier device (Q4) 95 is electrically coupled to capacitive element C22, so as to be an impedance-matching amplifier. The 125 KHz PWM signal output 44 of the controller 40 generates a ramp wave at 92 when filtered by resistive element R27 and capacitive element C22. This ramp wave is buffered by the amplifier device (Q4) 95 then superimposed on CS by capacitive element C36 and resistive element R14.

Method of PWM-dimming

Having described the components of the dimming circuit, a method of proportional-current PWM-dimming using the same will now be described. For illustrative purposes only, the controller will assumedly operate at 1 MHz and the main clock of the controller will be divided in eighths to provide a PWM main clock signal of approximately 125 kHz to the main switch driving circuit, which, correspondingly, sets the switching frequency of the main switch at 125 kHz.

Figure 2:
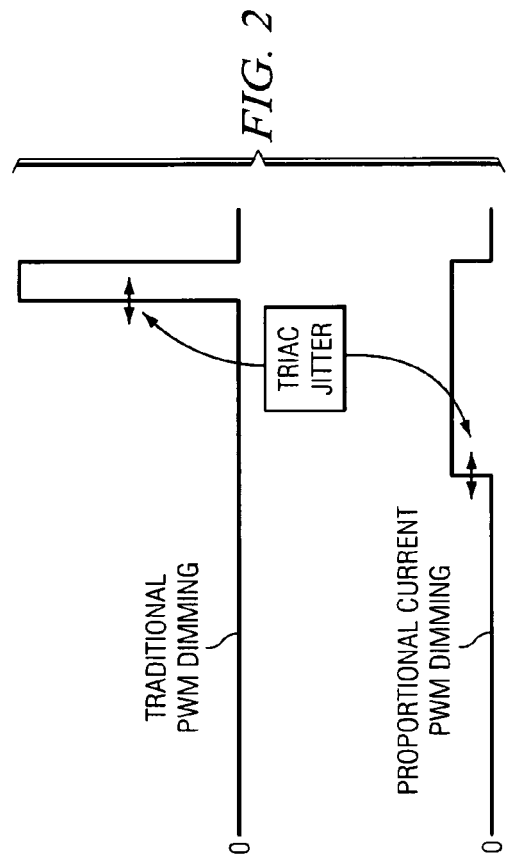
FIG. 2 shows comparative duty cycles for traditional PWM-dimming (top) and proportional-current PWM-dimming (bottom)

Comparative duty cycle pulses for conventional PWM-dimming (top) and for proportional-current PWM-dimming (bottom) are shown in FIG. 2. The areas under the pulses in both the top and bottom waveforms represents the average output current to the lights source(s). It should be noted that, in both the top and bottom waveforms, the areas under each pulse are the same or substantially the same. Hence, the intensity of the light sources associated with each waveform should appear to the human eye as the same or substantially the same.

Although the areas under the pulses are the same or substantially the same, those of ordinary skill in the art, however, can appreciate that TRIAC jitter and the resulting flicker associated with the leading or rising and trailing or falling edges of the (top) traditional PWM-dimming duty cycle is significantly greater than the TRIAC jitter associated with the leading or rising and the trailing or falling edges of the (bottom) proportional current PWM-dimming duty cycle. The intent of the present invention, then, is to control the amplitude of the current proportional, i.e., by establishing a limiting, peak current (I_LIM), and the duration of the duty cycle, to reduce jitter and the resulting flicker.

Figure 3:
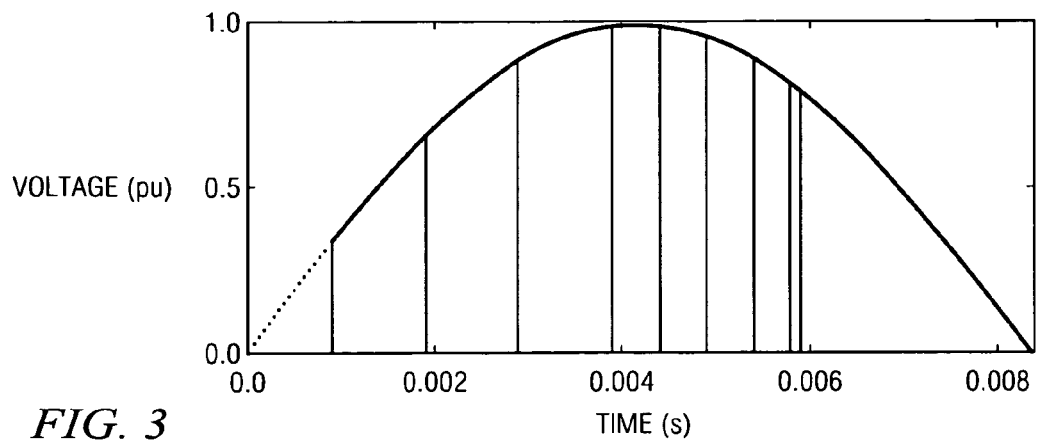
FIG. 3 shows the relationship between input voltage and various phase delay stages.
Figure 4:
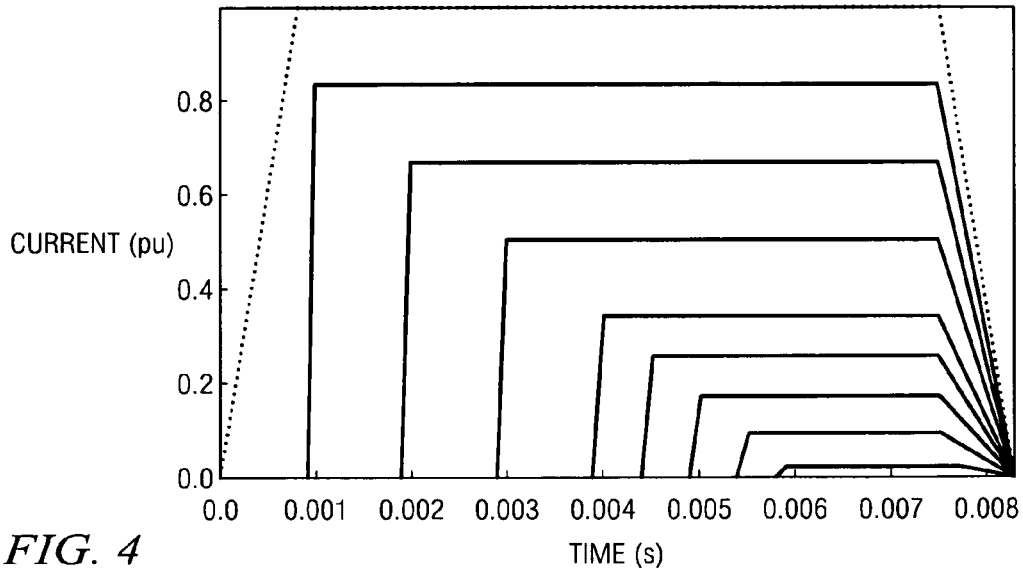
FIG. 4 shows light-source output current at various phase delay stages.

FIG. 3 and FIG. 4 further illustrate the benefits of proportional-current PWM-dimming. FIG. 3 shows the TRIAC dimmer voltage output for various phase-delay states and FIG. 4 shows the related LED current waveform. Advantageously, as shown in FIG. 4, there is no or substantially no current flowing to the light source(s) when the phase-delay is greater than approximately 5.9 msec. Hence, there is no flicker.

When the rheostat or variable resistor of the dimming device is adjusted to dim the light source(s), the flow of current to the firing capacitor is reduced and, correspondingly, so is the duty cycle of the TRIAC. Although the following description will involve a dimming action, those of ordinary skill in the art can appreciate the application of the same when the desired action is light brightening rather than light dimming.

In a first step, phase-controlled, 120 VAC, 60 Hz power is provided to the phase-angle detection circuit and to the dv/dt filter. The comparator of the phase-angle detection circuit compares the input voltage from the phase-controlled, 120 VAC, 60 Hz power source and outputs a digital DC pulse signal to the controller whenever the input voltage exceeds a threshold voltage, e.g., 100 VDC.

In a next step, using the voltage data from the comparator, the controller calculates and outputs a limiting, peak current value (I_LIM) to the main switch driving circuit in the form of a second PWM signal. The frequency of the second PWM signal is between 1 and 2 kHz as compared to a frequency of 125 kHz for the main clock PWM signal. Similar to what is shown in FIG. 2, the application, driver program, algorithm, and the like used by the controller calculates a limiting, peak current (I_LIM) having a lower amplitude and a longer duration than is traditionally output when conventional light sources are being dimmed. The scaled current value will be proportional to the pseudo-representative RMS value of the AC input voltage.

In a next step, the main switch driving circuit compares the limiting, peak current (I_LIM) to a current sense (CS) signal. More specifically, as shown in FIG. 5, the voltage associated with the CS signal and the voltage associated the limiting, peak current (I_LIM) are compared.

Depending on the relationship between the voltages associated with limiting, peak current (I_LIM) and with the CS signal, the main switch driving circuit will cause the gate of the main switch to be closed (turned ON) or open (turned OFF). As long as the voltage associated with the limiting, peak current (I_LIM) is greater than the voltage associated with the CS signal, the main switch remains ON. However, when the voltage associated with the CS signal exceeds the voltage associated with the limiting, peak current (I_LIM), the main switch is turned OFF until the next leading or rising edge of the main clock cycle from the first PWM signal. This keeps the current to the light sources at or below the limiting, peak current (I_LIM) at all times.

Figure 5:
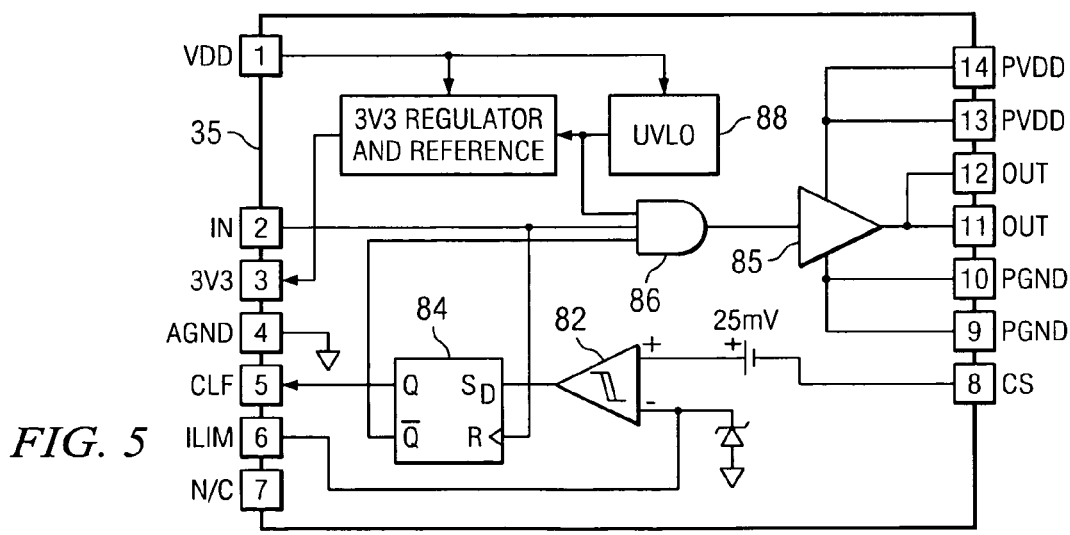
FIG. 5 shows an illustrative functional block diagram of a main switch driving circuit in accordance with the present invention.

Referring to FIG. 5, the illustrative logic circuitry enabling a main switch driving circuit to accomplish proportional-current dimming is shown. Voltage associated with the CS signal on the CS pin (pin 8) is compared to the voltage output by the RC filter associated with the limiting, peak current (I_LIM) (pin 6). The comparator 82 output SETS (S) an R/S flip flop 84 that has been RESET (R) from the rising edge of the main clock (IN at PIN 2). For example, as long as the voltage associated with the CS signal is less than the voltage associated with the limiting, peak current (I_LIM), the comparator will keep the flip-flop 84 in RESET and the gate of the main switch will remain closed and turned ON. However, when the voltage associated with the CS signal equals or exceeds the voltage associated with the limiting, peak current (I_LIM), the comparator 82 will output a signal to SET flip-flop 84, which sends a voltage LO signal to the logic AND-gate 86, causing the operational amplifier 85 to open the gate (turned OFF) of the main switch. The main switch will remain turned OFF until the next leading or rising edge of the PWM main clock switching cycle.

The impact of the state of the main switch affects the power stage and current to the light source(s) as follows. As power (current) is delivered to the light source(s), the input current is also fed to the drain of the main switch via an inductive element (L1) 52 (FIG. 1). When the gate of the main switch is open (turned OFF), the current is prevented from flowing through the main switch and, instead, flows through a diode (D8). As a result, the power (current) to the light source(s) ramps down, dimming the light source(s). When, on the other hand, the gate of the main switch is closed (turned ON), current flows through the main switch and, accordingly, power (current) to the light source(s) ramps up until the voltage associated with the CS signal again equals or exceeds the voltage associated with the limiting, peak current (I_LIM).

The current that flows through the main switch is, in turn, measured and filtered, to provide the CS signal. More particularly, a current-sensing means 37, e.g., a pair of resistive elements (R3 and R20), samples the current, producing an associated voltage, which, as previously mentioned, is applied to the CS pin and compared to the voltage associated with the limiting, peak current (I_LIM). As a result, the sensed current—along with any ripple current in the inductive element (L1) 52—is used to set the RMS current to the light source(s) 80. In this process, DC constant current from a phase-controlled, AC power source can be controlled to high-power LEDs or LED clusters can be controlled to minimize jitter and flicker.

Optionally, one of the software and/or hardware applications, driver programs, algorithms, and the like can be structured and arranged to receive and process the pulse signal(s) from the comparator; to discard anomalies or "outriders" that exceed predetermined voltage limits; and to average the pulse signal. Alternatively or additionally, when the phase-angle detection circuit detects a large, instantaneous change in input voltage, but which still falls within tolerable voltage limits, another of the software and/or hardware applications, driver programs, algorithms, and the like can be structured and arranged to provide a non-immediate, gradual dimming. Optionally, the controller can also be adapted to filter the pulse signals from the comparator to gradually dim the light source(s), e.g., during power UP or power DOWN sequencing.

In another software- and/or hardware-embodied application, driver program, algorithm, and the like, the controller can provide over-temperature protection. For example, the controller can monitor a plurality of temperature sensing devices 48 and 49, e.g., negative temperature coefficient thermistors. A first temperature sensing device 48 can be disposed proximate the main switch and a second temperature sensing device 49 can be disposed proximate the heat removal device(s) for the light source(s).

During operation, when the sensed first and/or second temperatures exceed predetermined threshold temperatures for the main switch and/or heat removal device, the controller is adapted to throttle back or lower the limiting, peak current (I_LIM). For example, current reduction can be performed using a linear relationship that decreases from full current to zero current over a 20° C. range. Furthermore, if the light source(s) is/are disposed in a cooling-restricted area, the controller can reduce the limiting, peak current until the temperature stabilizes somewhere along the linear reduction curve.

It will be apparent to those skilled in the art that modifications to and variations of the disclosed method and system are possible without departing from the inventive concepts disclosed herein, and therefore the invention should not be viewed as limited except to the full scope and spirit of the appended claims.

What is claimed is:

1. A pulse width modulation-based dimming circuit for adjusting DC constant current from a phase-controlled, AC power source to at least one light source, the circuit comprising:
   a phase-angle detection circuit that senses input voltage from the AC power source and provides a DC pulse signal when the sensed input voltage exceeds a predetermined threshold voltage;
   a power stage that is electrically coupled to the at least one light source and that is adapted to control delivery of power to the at least one light source;
   a dv/dt filter that is electrically coupled to the AC power source and to the power stage and that is adapted to filter out voltage transients and to prevent reverse current ring back;
   a controller power supply that provides power to the power stage; and
   a controller that is adapted to establish a first pulse width modulation (PWM) switching frequency; to adjust a duty cycle of a second PWM signal; and to adjust a peak level of the current during the duty cycle, based on the DC pulse signals from the phase-angle detection circuit and on sensed current levels from the at least one light source.

2. The circuit as recited in claim 1, wherein the power stage is a buck regulator.

3. The circuit as recited in claim 1, wherein the dv/dt filter includes:
   a dampening resistive element; and
   a relatively-low equivalent series resistance inductive element.

4. The circuit as recited in claim 1, wherein the controller power supply includes:
   a start-up linear regulator that maintains voltage to the power stage at a predetermined level before switching begins;
   a flying capacitor charge pump that is adapted to provide additional power (current) to the power stage after switching begins; and
   an over-voltage clamp circuit that is adapted for dissipating energy.

5. The circuit as recited in claim 1, wherein the flying capacitor charge pump includes:
   a flying capacitor that is electrically coupled to the power stage for storing charge from said power stage and delivering said charge to a main switch driving circuit as needed; and
   current-sensing means for sensing current levels at the power stage.

6. The circuit as recited in claim 1 further comprising at least one temperature sensing device that is electrically coupled to the controller and the controller is adapted to reduce the peak level of current when temperatures exceed predetermined threshold temperatures.

7. The circuit as recited in claim 1, wherein the power stage includes an output filter to expand a light source dimming range to include very low light current levels.

8. The circuit as recited in claim 7, wherein the output filter is a RC circuit including at least one resistive element and at least one capacitive element and the RC circuit is in parallel with the power stage.

9. The circuit as recited in claim 1, wherein the phase-angle detection circuit includes:
   a voltage divider that establishes the predetermined threshold voltage;
   a comparator that is electrically coupled to the controller that compares the sensed input voltage and the predetermined threshold voltage; and
   a capacitive element that is electrically coupled to an output of the comparator and to an input of the controller and that provides the DC pulse signal.

10. The circuit as recited in claim 9, wherein the capacitive element is part of an RC circuit that filters the DC pulse signal.

11. The circuit as recited in claim 9, wherein the comparator is adapted to output a voltage HI pulse signal when the sensed input voltage exceeds the predetermined threshold voltage and to output a voltage LO pulse signal or no signal when said sensed input voltage is less than said predetermined threshold voltage.

12. The circuit as recited in claim 1, wherein the controller includes:
   a processing unit that is structured and arranged to execute a plurality of software- and/or hardware-based applications, driver programs, and algorithms;
   a main switch that is electrically coupled between the processing unit and the power stage; and
   a main switch driving circuit that is adapted to control power to said at least one light source based on a limiting, peak current signal and a pulse width modulation signal output from the processing unit.

13. The circuit as recited in claim 12, wherein the main switch driving circuit is adapted to compare a voltage associated with the limiting, peak current signal with a voltage associated with a sensed current signal from the power stage.

14. The circuit as recited in claim 13, wherein the main switch driving circuit is adapted to turn off the main switching device when the sensed current signal is greater than or equal to the limiting, peak current signal.

15. A constant current source to control dimming of at least one light source, the source comprising:
   means for sensing an input voltage from a phase-controlled, AC power source;
   means for pulse width modulation-based dimming, which means is adapted to provide power (current) to the at least one light source whenever the sensed input voltage exceeds a predetermined voltage threshold; and
   means for proportional-current dimming that is adapted to modify power to the at least one light source when a current sensed at said at least one light source is greater than or equal to a limiting, peak current.

16. The constant current source as recited in claim 15, wherein the means for proportional-current dimming includes:
   a processing unit that is structured and arranged to execute a plurality of software- and/or hardware-based applications, driver programs, and algorithms, to calculate the limiting, peak current;
   a main switch that is electrically coupled between the processing unit and the at least one light source; and
   a main switch driving circuit that is adapted to control power (current) to said at least one light source based on a limiting, peak current signal and a pulse width modulation signal output from processing unit.

17. The constant current source as recited in claim 16, wherein the main switch driving circuit is adapted to compare a voltage associated with the limiting, peak current signal with a voltage associated with a sensed current signal from the at least one light source.

18. The constant current source as recited in claim 17, wherein the main switch driving circuit is adapted to turn off the main switch when the sensed current signal is greater than or equal to the limiting, peak current signal.

19. A proportional-current light-dimming device for controlling current to at least one light source at low and relatively-low phase angles of an input voltage, the device comprising:
   current sensing means for sensing a current flowing through the at least one light source;
   a processing unit that is adapted to calculate a limiting, peak current based on the input voltage;
   a main switch driving circuit that is adapted to compare a signal associated with the sensed current with the limiting, peak current; and
   a main switch that is adapted to increase current to the at least one light source when the signal associated with the sensed current is less than the limiting, peak current and to decrease current to said at least one light source when said signal associated with said sensed current is greater than or equal to said limiting, peak current.

20. A method of controlling current to at least one light source to control light-dimming using a dimming device, the method comprising:
   sensing an input voltage from a phase-controlled AC source;
   sensing a current flowing through the at least one light source;
   calculating a limiting, peak current using the input voltage;
   providing pulse width modulation-dimming signals to the at least one light source whenever the sensed current is less than the limiting, peak current;
   providing proportional-current dimming signals to the at least one light source whenever the limiting, peak current is less than or equal to the sensed current.

21. The method as recited in claim 20, wherein calculating a limiting, peak current includes adjusting a peak current limit at a lowest current light level and associated phase angle that are above a point at which flicker in the at least one light source is caused by jitter of the TRAIC-dimming device.

22. The method as recited in claim 20, wherein providing proportional-current dimming signals includes adjusting current magnitude levels proportional to duty cycle, to provide the same or substantially the same average output current as pulse width modulation-dimming signals using the sensed current.

23. The method as recited in claim 20, wherein providing pulse width modulation-dimming signals includes outputting a PWM-dimming signal whenever the sensed input voltage exceeds a pre-determined threshold voltage.

* * * * *